Oct. 13, 1931.    R. R. SEARLES    1,827,711
SPRING CONNECTION
Filed April 13, 1929
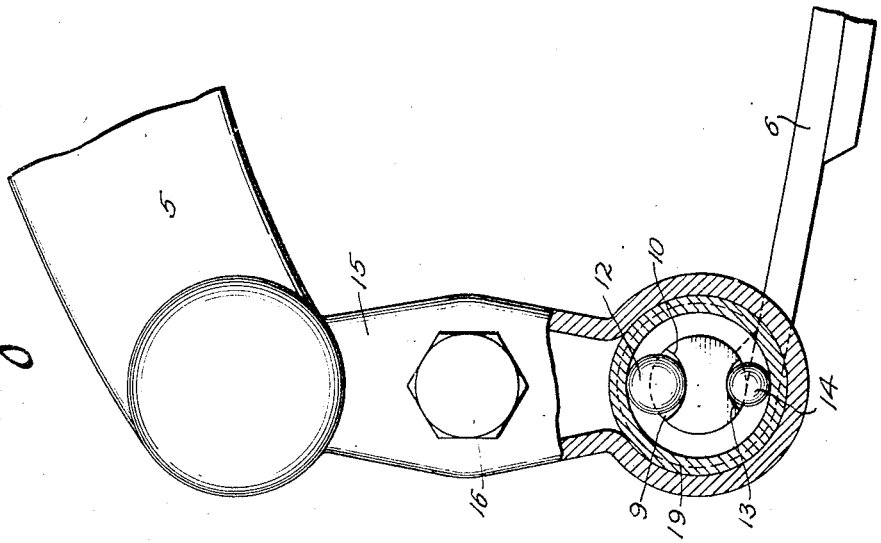
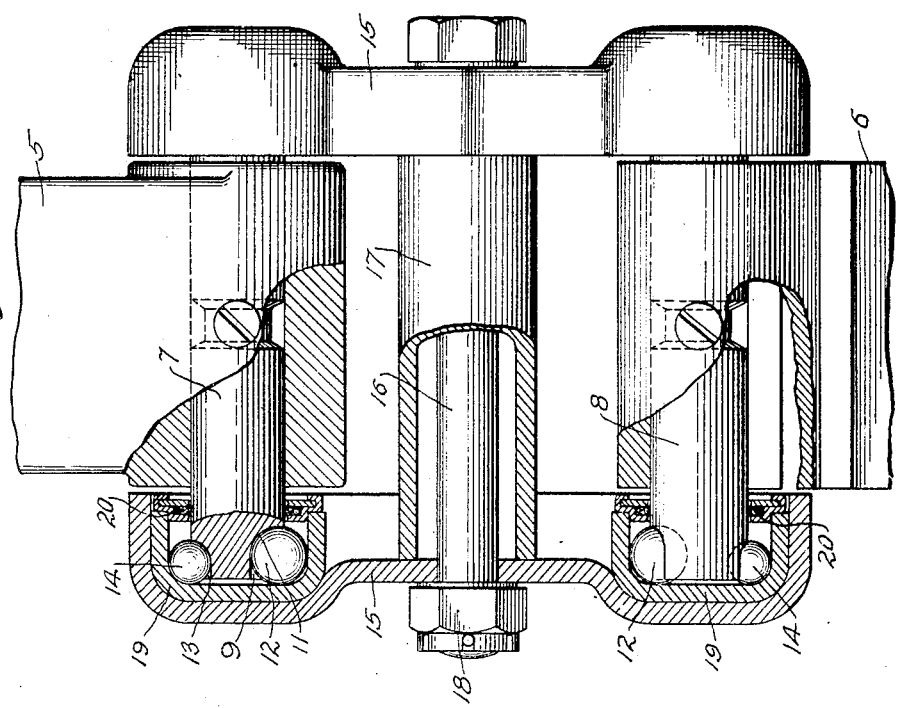
INVENTOR
Raymond R. Searles
BY
ATTORNEYS Patented Oct. 13, 1931

1,827,711

UNITED STATES PATENT OFFICE

RAYMOND R. SEARLES, OF NEW BRITAIN, CONNECTICUT, ASSIGNOR TO THE FAFNIR BEARING COMPANY, OF NEW BRITAIN, CONNECTICUT, A CORPORATION OF CONNECTICUT

SPRING CONNECTION

Application filed April 13, 1929. Serial No. 354,720.

My invention relates to a spring end connection for connecting the frame and spring of a motor vehicle.

It is an object of the invention to provide an improved spring end connection, which is simple in construction, cheap to manufacture, and which will be serviceable in use.

It is a further object to provide a ball bearing spring end connection in which relatively few balls need be employed.

Other objects will appear as the specification proceeds.

In the drawings I have shown, for illustrative purposes only, one form of my improved spring end connection as embodied in a spring shackle.

In said drawings—

Fig. 1 is a fragmentary end view of a frame and spring connected by an improved shackle construction, parts being shown in section for purpose of illustration;

Fig. 2 is a side view of the construction shown in Fig. 1, parts being shown in section.

In said drawings, 5 indicates the frame of a motor vehicle, while 6 indicates a spring. The particular form of connection between the spring and frame is that of a shackle, but it is to be understood that the invention may also be embodied in the so-called hinge end for connecting the frame and spring.

As illustrated, the frame carries means, such as a pin 7, while the spring carries a similar pin 8. Each pin is formed in the same manner at each end, and for that reason only one end of each pin is shown in detail. Each pin has a cup seat or raceway 9 therein, which may be curved transversely as shown at 10 in Fig. 2, and curved longitudinally, as shown more particularly at 11 in Fig. 1. The radius of transverse curvature 10 is preferably greater than the radius of curvature of the bearing ball 12 seated thereon. The longitudinal curvature 11 is preferably slightly greater than the radius of curvature of the corresponding ball 12. The cup seat 9 may be said to be an angular contact seat in that the resultant of forces acting on the ball extends angularly relatively to the pin axis just as is the case in a so-called angular contact bearing having complete circumferential seats. At the opposite side of each pin end may be a second and preferably smaller seat recess 13, which may be and preferably is similar to the seat 9 heretofore described. A bearing ball 14 rests upon the seat 13 in the same manner as heretofore described in connection with the seat 9.

It will be seen that the balls 12 may roll or rock transversely of the pin, though the rolling or rocking in a direction longitudinally of the pin is preferably quite limited. The form of the seat as shown is such that the balls 12 take both radial and end thrust loads.

The connecting means, such as the links 15—15, may be connected together by means of a through bolt 16 and spaced apart as by a spacer sleeve 17 interposed therebetween, so that when the nut 18 on the through bolt is drawn up tightly the shackle links are spaced apart a definite distance, depending upon the length of the spacer 17. Each shackle link has a raceway, such as the cup 19, at opposite ends thereof for coaction with the bearing balls 12—14. The raceways 19 are angular contact raceways complementary to the seats or raceways on the pins 7—8. A suitable dust ring, as 20, may be provided for excluding dust and dirt from the bearing surfaces and retaining lubricant thereon.

It will be seen that during normal operation, and with the shackle arranged as shown, the weight of the car acts downwardly through the frame 5 and pin 7, and such weight is carried by the upper large balls 12 at opposite sides of the frame. The weight of the car is transmitted through the shackle links to the lower large balls 12 and thence to the pin 8 and spring 6. The principal function of the balls 14 is to resist the relatively smaller forces on a severe rebound, and since the rebound is usually relatively slight compared with the weight and inertia forces of the car body, the balls 14 may be small, and in some cases may be omitted entirely. Due to the angular contact of the raceways with the antifriction bearing members both radial and end thrust loads are carried by the antifriction bearing members and there will be no sliding parts to cause squeaks.

During the flexing of the spring the balls may oscillate or rock on the races 9—9, and the corresponding outer race members 19. The motion is not strictly that of a normal ball bearing, in that there will be some sliding action, but there will also be some rolling, so that there will be relatively less friction than if the entire action were that of sliding. The lubrication of such sliding and rolling surfaces will be much more effective than can ordinarily be obtained with pure sliding surfaces where the grease or oil is very soon squeezed out from between the contacting surfaces. Due to the rocking or rolling of the balls on their respective raceways, fresh surfaces come in contact with each other at frequent intervals, and the lubricant is properly distributed onto the bearing surfaces so that there will be substantially no squeaking of parts even with considerable sliding action.

Such a ball bearing shackle construction as I have herein disclosed employs relatively few balls, and all parts are simple and relatively cheap to manufacture. While the specific embodiment herein is that of a shackle, it is to be understood that the same principles herein disclosed may be employed for the so-called hinge end wherein there are no movable shackle links, and wherein the connection is that of a hinge.

While the invention has been described in considerable detail, I do not wish to be strictly limited to the form and proportions shown, since changes may be made within the scope of the invention as defined in the appended claims.

I claim:

1. A spring connection for connecting the frame and spring of a motor vehicle, pin means to be carried by one of said connected parts, said pin means having at the side of each end an outwardly opening curved angular contact bearing cup seat, an antifriction bearing member on each of said seats, and angular contact raceway means carried by the other of said connected members for engagement with said antifriction bearing members whereby both radial and end thrust loads will be carried by said antifriction bearing members.

2. In a spring connection for connecting the frame and spring of a motor vehicle, one of said members carrying means having at the side thereof an angular contact cup seat, an antifriction bearing member on each said seat and extending outwardly beyond said means having said seat, and means carried by the other of said connected members and having an angular contact raceway member for engagement with said antifriction bearing members whereby both radial and end thrust loads will be carried by said antifriction bearing members.

3. In a spring connection for connecting the frame and spring of a motor vehicle, pin means to be carried by one of said connected members, said pin means having an angular contact cup seat in the side of the end thereof, an anti-friction bearing member of greater curvature than the curvature of said seat, the other of said connected members having an angular contact raceway member for coaction with said anti-friction bearing member whereby the latter will carry both radial and end thrust loads.

4. In a spring connection for connecting the frame and spring of a motor vehicle, pin means to be carried by one of said connected members and projecting beyond the sides thereof, said pin means having in the sides of each end a pair of angular contact cup seats opening transversely of said pin means at opposite sides thereof, a bearing ball in each of said cup seats, the other of said connected members having an angular contact raceway member adapted to engage said bearing balls whereby the latter will carry both radial and end thrust loads.

5. In an antifriction bearing spring shackle construction, shackle links to connect a frame and spring, means to be carried by the frame and spring and having opposed angular contact cup-shaped seats thereon at opposite sides of said frame and spring, bearing balls on said seats, said shackle links having angular contact bearing raceways for coaction with said bearing balls whereby the latter will carry both radial and end thrust loads.

6. In a spring shackle construction, a pin to be carried by a frame and extending from opposite sides thereof, a pin to be carried by a spring and extending from opposite sides thereof, the sides of the ends of each of said pins having an angular contact cup-shaped seat thereon, a bearing ball of a smaller radius of curvature than the curvature of said cup-shaped seats carried by said seats, and a pair of shackle links having angular contact raceway seats thereon for engagement with said bearing balls whereby the latter will carry both radial and end thrust loads.

7. In a spring shackle construction, a pin to be carried by a frame and extending beyond the sides thereof, a pin to be carried by a frame and extending beyond the sides thereof, each said pin having at the side of each end angular contact cup-shaped bearing seats opening transversely of said pins and at opposite sides of the end thereof, bearing balls on said seats, and shackle means having angular contact bearing seats for engagement with said bearing balls, for the purpose described.

8. In a spring connection for connecting a frame part and spring part comprising a plurality of bearings, each bearing comprising a member having a plurality of separate raceways at spaced circumferential points thereon, anti-friction bearing members on
5 said raceways, and a second member having raceway means for coaction with said anti-friction bearing members, one member of each said bearing being supported from the spring and the other member of each said
10 bearing being supported from said frame for the purpose described.

RAYMOND R. SEARLES.